(12) United States Patent
Jamdar et al.

(10) Patent No.: US 9,560,152 B1
(45) Date of Patent: Jan. 31, 2017

(54) PERSONALIZED SUMMARY OF ONLINE COMMUNICATIONS

(71) Applicant: International Business Machines Corporation, Armonk, NY (US)

(72) Inventors: Rohan M. Jamdar, Pune (IN); Nidhi S. Kulkarni, Pune (IN); Sonia L. Sequeira, Pune (IN); Xinyi Xu, Northbrook, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/007,273

(22) Filed: Jan. 27, 2016

(51) Int. Cl.
| | |
|---|---|
| *G06F 15/16* | (2006.01) |
| *H04L 29/08* | (2006.01) |
| *H04L 29/06* | (2006.01) |
| *G06Q 50/00* | (2012.01) |
| *G06F 17/30* | (2006.01) |

(52) U.S. Cl.
CPC ......... *H04L 67/22* (2013.01); *G06F 17/30011* (2013.01); *G06F 17/30719* (2013.01); *G06Q 50/01* (2013.01); *H04L 65/1066* (2013.01); *H04L 65/403* (2013.01); *H04L 67/306* (2013.01)

(58) Field of Classification Search
CPC ................... G04F 17/30719; G04F 17/30867; G04F 17/30011; G06Q 50/01; H04L 67/306

See application file for complete search history.

(56) References Cited

U.S. PATENT DOCUMENTS

| | | | |
|---|---|---|---|
| 8,335,827 B2 | 12/2012 | Mishchenko | |
| 8,626,832 B2 | 1/2014 | Jerrard-Dunne et al. | |
| 8,661,359 B2 | 2/2014 | Karmon et al. | |
| 8,849,958 B2 * | 9/2014 | Liebald | G06F 17/30702 709/217 |
| 2012/0136939 A1 | 5/2012 | Stern et al. | |
| 2013/0006973 A1 * | 1/2013 | Caldwell | G06F 17/30719 707/723 |
| 2013/0325972 A1 * | 12/2013 | Boston | G06K 9/00751 709/206 |
| 2014/0325005 A1 | 10/2014 | Turski et al. | |

* cited by examiner

*Primary Examiner* — Chirag R Patel
(74) *Attorney, Agent, or Firm* — Daniel R. Simek

(57) ABSTRACT

A method for generating an output of users that are communicating online in which one or more processors gathers data of topics of interest for each group member. One or more processors receive content of an online communication session and sends the content to a cognitive engine to determine the topic and summary information of the session. The cognitive engine sends the topic to a graphic engine to obtain a pictorial representation of the topic. One or more processors receive the summary information and pictorial representation and generates personalizes summaries for the group members based on the interests determined for each group member from prior online sessions.

20 Claims, 4 Drawing Sheets

PERSONALIZED SUMMARY OF ONLINE COMMUNICATIONS

FIELD OF THE INVENTION

The present invention relates generally to the field of communications, and more particularly to formatting output of online group communications.

BACKGROUND OF THE INVENTION

Instant messaging and messenger services are among the most commonly used communication services on mobile devices. Some reasons for the popularity of applications, or "apps," are that they are often free, always available, and offer the ability to converse with multiple people at the same time (e.g., through groups), with the convenience of a mobile platform. The many positive aspects that messaging services have to offer also seem to contribute to some of the more challenging aspects of their use. Online group communications, or "conversations," may generate large quantities of messages in just a matter of minutes, depending on the group size, group membership, and topics. Large numbers of messaging responses may be more likely, and may accrue in situations in which the groups include members from different countries and time zones, globally.

Online communication sessions may include multiple topics, and a particular group member may have interest in some topics, and limited or no interest in other topics. Online communication session group members often scan through the received content to determine the topics covered and additional input of interest from other group members.

SUMMARY

Embodiments of the present invention disclose a method, computer program product, and system for generating a summary of an online communication session. The method for generating a summary of an online communication session provides for one or more processors to receive a particular topic and summary information for each of one or more episodes of a current online communication session, and information regarding topics of interests for each member of a group of users, wherein content of the online communication session is generated by members of the group of users. One or more processors receive a pictorial representation of the particular topic for each of the one or more episodes of the current online communication session, wherein determining the pictorial representation of each episode of the one or more episodes of the current online communication session is based on the particular topic of each episode, and one or more processors generate a summary of the current online communication session that is personalized for each member of the group of users, wherein the summary that is personalized includes listing the pictorial representation and the summary information for the particular topic of each of the one or more episodes of the online communication session, in an order that is based on the particular topic for each of the one or more episodes and the topics of interests determined for each member of the group of users.

DETAILED DESCRIPTION

Figure 1:
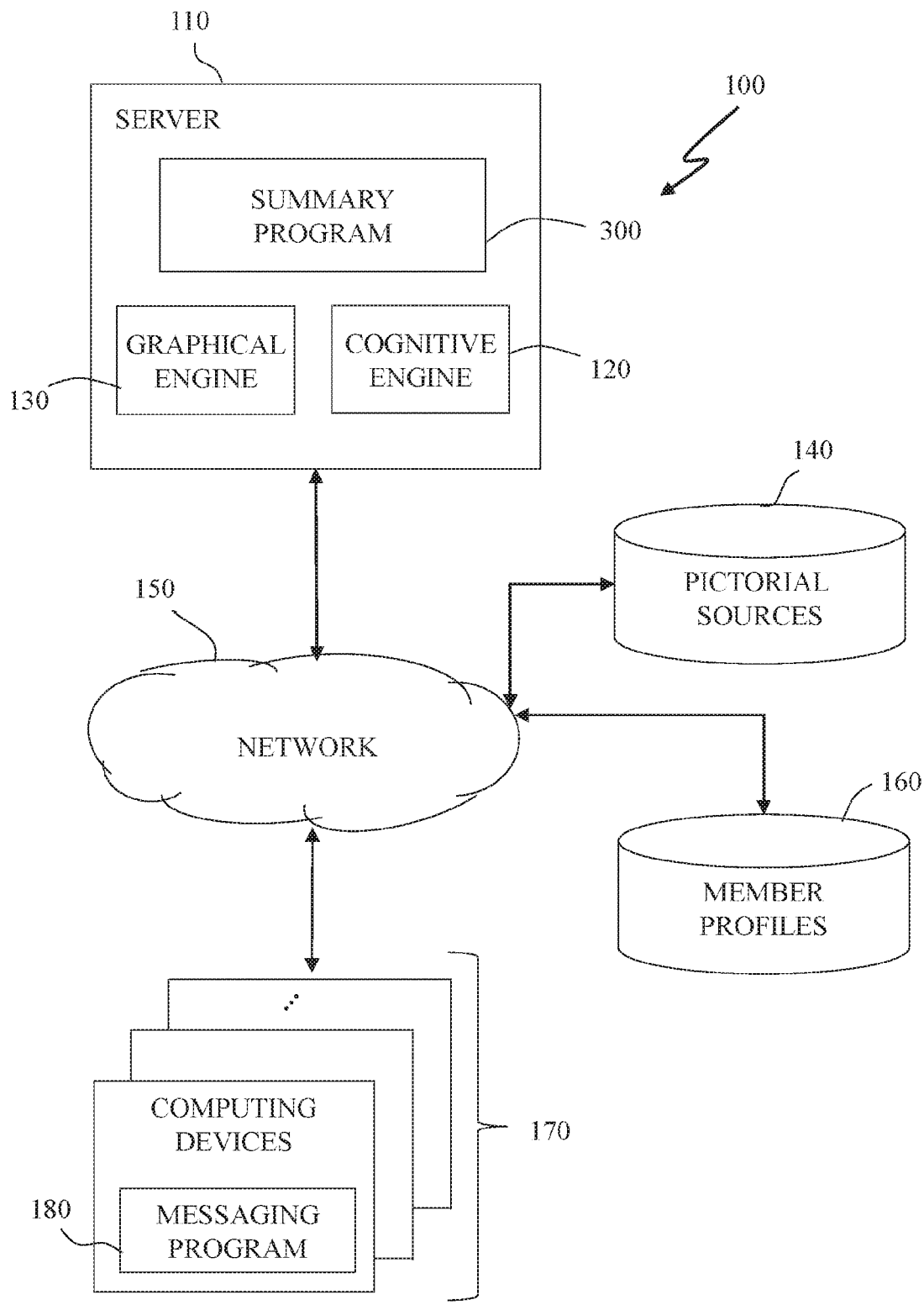
FIG. 1 is a functional block diagram illustrating a distributed data processing environment, in accordance with an embodiment of the present invention.

Embodiments of the present invention recognize that content received from an online communication session, such as an online group chat text messaging session, for example, may result in a condition of information overload. Information overload occurs when a recipient of content from multiple online communication sessions with group members, lacks the time or inclination to review all of the received content from the online sessions, to determine topics and content of interest. For example, an online communication group that includes members located in various time zones, can generate significant content within one or more sessions. Thus, overnight a group member's mobile device may be flooded with large quantities of messages. Many mobile device users would not have the time or the inclination to read through all the received messages, and some devices may have memory limitations that are affected by receiving large quantities of messages.

Faced with situations of receiving large quantities of messages, some users may apply features to mute or block receipt of messages from groups, which removes the benefits and information received from social media sources, or postpones the individual interruptions to an aggregate download at a later time. Users face situations of information overload, or respond by suppressing incoming messaging. Efforts to blindly block or mute the receipt of content from communication sessions omits social media information that may be of interest and use to a user, or postpones the interruption of each communication item by aggregating the session content for later time-consuming review. Attempts to summarize communication session content lacks consideration of interest levels of group members and summarizes at too high a level of detail, or too low a level of detail for a particular member of an online communication group. Additionally, previous attempts to summarize online communication content from multiple sessions continues to require a significant level of a group member's review to determine whether the contents of sessions are of interest.

Embodiments of the present invention provide a method, computer program product, and computer system for generating a summary of an online communication session of a group of users that is personalized for each member of the group of users. The method for generating a summary provides for one or more processors to gather data regarding topics of interest for each member of a group of users that are communicating online. The topics of interest for each member of the group are determined from the participation and contributions made during the current online communication session, and from stored topics of interest determined from previous online communication sessions in which each respective member of the group indicated an interest. The content from a current online communication session held by the group of users is received, and each member of the group of users is categorized as one of an originator, an interested participant, an interested non-participant, or a non-interested participant, with respect to the topics of the current online communication session. The content of the current online communication session is processed by a cognitive engine, which determines a main topic associated with each section, or episode, of the communication session. The cognitive engine also determines summary information relevant to each episode topic. The topics and in some embodiments of the present invention, the summary information associated with each episode of the current online communication session are sent to a graphical engine, which searches and obtains graphic content to pictorially represent each topic determined from the current online communication session. A personalized summary of the current online communication session is generated for each of the members of the group, based on the respective member's topics of interest that are determined from the current online communication and from previous online communication sessions in which respective members of the group have participated, including communication sessions with other groups.

For example, in a group consisting of male and female users, there may be a an online texting conversation in which the females are discussing websites offering heavy discounts on shoes, purses, and accessory items. The discussion may be of no interest to the males of the group, so for the males, the summarization and pictorial representation of the topic of discount shoes, purses, and accessories, may be skipped completely in personalized summaries for the males of the group of users. Alternatively, the summary and pictorial representation of the discount items may be positioned far down a listing of summarized episodes on the personalized summaries for the males of the group of users, based on the known interests of the male group participants. On the other hand, for those participants that show a genuine interest in the topic, the cognitive engine will place the topic higher in the list of summarized episodes.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing devices 170, member profiles 160, pictorial sources 140, and server 110, all connected via network 150.

Network 150 can be, for example, a local area network (LAN), a telecommunications network, a wide area network (WAN), such as the Internet, a virtual local area network (VLAN), or any combination that can include wired, wireless, or optical connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between computing devices 170, pictorial sources 140, and member profiles 160, graphical engine 130, cognitive engine 120, and summary program 300, hosted on server 110, in accordance with embodiments of the present invention.

Computing devices 170 are two or more computing devices operated by users to participate in online communications through services managed and/or provided by server 110. Computing devices 170 enable users to engage in online communications that include text-based chat sessions, and when enabled with audio-to-text transformation capabilities, may support audio-based communications. Each device of computing devices 170 is associated with a particular member of a group of users that engage in online communication sessions. Computing devices 170 each include an instance of messaging program 180. Messaging program 180 is an online communications program, or "app," in which two or more users operate messaging program 180 from a device of computing devices 170, respectively, and engage in online communications, such as a text-based conversation. Messaging program 180 may be, for example, an online text messaging service, such as WhatsApp™ (WhatsApp is a trademark of WhatsApp Inc., in the United States and other countries world-wide). In some embodiments of the present invention, messaging program 180 may be an access link to an online application hosted on a server providing online communication services.

Each device of computing devices 170 may be at least one of a laptop computer, a desktop computer, a netbook computer, a tablet computer, a smart phone, or any programmable electronic device capable of communicating with various components and devices within distributed data processing environment 100, via network 150. In general, computing devices 170 represent any programmable electronic device or combination of programmable electronic devices capable of executing machine readable program instructions and communicating with other computing devices (not shown) within distributed data processing environment 100 via a network, such as network 150. Computing devices 170 may include internal and external hardware components, as depicted and described in FIG. 4.

Member profiles 160 is a repository of information associated with each member of a group of users engaged in one or more online communication sessions. Member profiles 160 may include information associating a member with one or more devices, such as computing devices 170, used to operate messaging program 180 and participate in online communications. Member profiles 160 also includes information associated with preferences and topics of interest for each online communication member across all communication groups, such as chat groups, to which each member belongs. The topics of interest are determined by analysis of a member's participation in online communication sessions and episodes in which the member contributes or responds to session content. The analysis of member entries is performed by cognitive engine 120 in which the main topic(s) and summary information related to the topic of an episode of an online communication is determined. The cognitive engine can analyze and utilize the amount of participation, the frequency, the extent of commenting, the likes and re-postings, and the content of entries of a group member to determine the level of interest of individual members for each topic of a communication episode. Cognitive engine 120 can determine a group member's interests during the parsing and analysis of the content of the current online session, as well as performing (or having previously performed) the analysis on previous online sessions of all groups with which respective members have participated in online communication sessions. An online communication session, sometimes referred to as a "conversation," may include multiple episodes, with each episode associated with a particular subject matter topic, or in some cases a set of related topics.

Pictorial sources 140 is a repository of graphical and image content to be used by graphical engine 130 to condense a topic of an online communication episode into a pictorial representation. Pictorial sources 140 may be comprised of one or more repositories, accessible by graphical engine 130 via network 150. The graphical and/or image content of pictorial sources 140 includes metadata descriptive of the graphical or image content. Graphical engine 130 determines a best-fit match between the received topic for an episode of an online communication session from cognitive engine 120, and the metadata content associated with each graphic and image included within pictorial sources 140. The pictorial representation selected from pictorial sources 140 by graphical engine 130 is a best-fit match to an episode topic received by graphical engine 130. In some embodiments of the present invention, the topics of episodes from the current online communication session are received by graphical engine 130 from cognitive engine 120. In other embodiments, the topics associated with one or more episodes of the current online communication session are received by a computing device hosting a personalized summary application, such as summary program 300, and are sent to graphical engine 130 to obtain pictorial representation of episode topics.

The pictorial representation is included in a summarization for the online communication episode, which is provided to members of the online communication group. In some embodiments of the present invention, pictorial sources 140 may not be a single repository, but may rather be representative of one or more sources of graphical and image content connected to the Internet and accessed via network 150. The use of graphical or image content as a summarization indicator of an online communication episode is to condense the topic of the episode for immediate recognition and assessment as opposed to scanning through multiple lines of the communication to make a determination of the topic and content.

Server 110 provides resources enabling the analysis of online communication sessions, determining the group members and participants of the sessions, enabling receipt of a pictorial representation of a topic for episodes of a communication session, and enabling generation and delivery of personalized summarizations for group members of online communications. Server 110 includes graphical engine 130, cognitive engine 120, and summary program 300. In some embodiments of the present invention, server 110 can be a management server, a web server, a mobile computing device, or any other electronic device or computing system capable of receiving, sending, and processing data, and supporting the operational functions of cognitive engine 120 and graphical engine 130. In other embodiments, server 110 can represent a server computing system utilizing multiple computers as a server system, such as in a cloud computing environment. In still other embodiments, server 110 can be a laptop computer, a tablet computer, a netbook computer, a personal computer (PC), a desktop computer, a personal digital assistant (PDA), a smart phone, or any programmable electronic device capable of performing programmable instructions of summary program 300, enabling operation of cognitive engine 120 and graphical engine 130, and communicating with computing devices 170, member profile 160, pictorial sources 140, and other computing devices (not shown) within distributed data processing environment 100 via network 150. In another embodiment, server 110 represents a computing system utilizing clustered computers and components (e.g., database server computers, application server computers, etc.) that act as a single pool of seamless resources when accessed within distributed data processing environment 100. Server 110 may include internal and external hardware components, as depicted and described in further detail with respect to FIG. 4.

Graphical engine 130 receives topic information from summaries of online communication episodes performed by cognitive engine 120. In some embodiments, graphical engine 130 receives topic information of episodes of online communication sessions directly from cognitive engine 120. In other embodiments, graphical engine 130 receives topic information of episodes of online communication sessions from summary program 300, which has received the topic information from cognitive engine 120, and subsequently transmits the topics to graphical engine 130. Graphical engine 130 determines a best-fit match between the received topic for an episode of an online communication session from cognitive engine 120, and the metadata content associated with each graphic and image included within pictorial sources 140.

In some embodiments of the present invention, graphical engine 130 utilizes metadata associated with the graphic or image to determine a best-fit to the received episode topic. In other embodiments, graphical engine 130 may apply optical image recognition to graphics and images of pictorial sources 140 to determine a best-fit match to the received episode topic. In some embodiments of the present invention, graphical engine 130 selects content from pictorial sources 140 as representing the topic summary of an online communication episode and sends the graphic or image content to summary program 300 to generate personalized summaries of the communication episode for each member of the online communication group.

Cognitive engine 120 receives the content of the communication session and uses existing natural language processing techniques, semantic analysis, and sentiment determination to analyze the content. Cognitive engine 120 is configured to parse and analyze the content of the online communication session to identify the main topic of each episode of the communication session, and determine details associated with each episode topic. Additionally, cognitive engine 120 determines the topics of interest for members of the group for each communication session in which a member participates. Cognitive engine 120 analyzes input to the communication session by each member and determines whether there is a positive, neutral, or negative association of each topic with each participating member. Members participating in the group communication session but not offering input for a particular topic are determined to lack interest in the topic. Non-participating members may have previously established interest in a particular topic, or may have manually indicated topics of interest in their profile, stored in member profiles 160. Cognitive engine 120 continually assesses a member's interests by consolidating past and current input and participation among all online communication groups to which the member belongs. In some embodiments of the present invention, cognitive engine 120 sends episode topics from an online communication session to graphical engine 130 and receives back graphic or image content representing, or associated with, the topics of the online communication session. The analysis of the online communication session and the graphical content representing or associated with the episode topics of the online communication session are ultimately received by summary program 300 from cognitive engine 120, or a combination of receiving from cognitive engine 120 and graphical engine 130.

Summary program 300 receives results of analyzed online communication sessions from cognitive engine 120. The results include determining the interest level for each member of the online communications group for the current communication session, as well as the analyzed content of each episode of the communication session. The analyzed content includes, but is not necessarily limited to, a main topic for each episode of the online communication session, the originator of the topic, the contributions of each member for each topic, the summarization of each episode, and a graphical representation of each episode received from graphical engine 130. Summary program 300 uses the member profile information that includes the previously determined interests of each member of the online communications group from previously attended sessions, as well as the determined interest level of the current communication session, to prepare a personalized summary for each member. The personalized summary is based on the member's interest level of the topic of each episode of the communication session.

Summary program 300 also includes information regarding a categorization of the members for the episode of the online communication session. The categories of group members include: the originator of the topic of the episode; participating group members of the communication session giving their views, recommendations, affirmations; interested non-participants group members whose interest has been determined from previous online communication sessions of this group or other groups, but were not part of this particular communication session; non-interested-participants that provide no input for the current online communication session episode, and have shown no interest in previous communication session episodes of this topic. Determination of the categorization of members for episodes of the online communication session is used in consideration of topics of interest for each member of the group of users.

In some embodiments of the present invention, summary program 300 provides a complete summary and pictorial representation for those group members determined to have interest in the topic of an online communication session episode, and summary program 300 provides a more condensed summary for group members having demonstrated low or no interest in the episode topic. In some embodiments of the present invention, a complete summary includes a text title of the topic, one or more text sentence summarizing the episode, and may include pertinent comments by participants, which support or align with the summarizing sentence. In some embodiments, a condensed summary includes a text title of the topic, or an unordered-list summary statement. In both complete and condensed summaries, a pictorial representation is included to enable a brief and efficient assessment of the episode topic by a member of the group of users receiving a personalized summary. In some embodiments of the present invention, a group member may be able to edit their member profile interests and indicate whether a complete summary, a condensed summary, or no summary should be provided for one or more member profile topics of interests.

Figure 2:
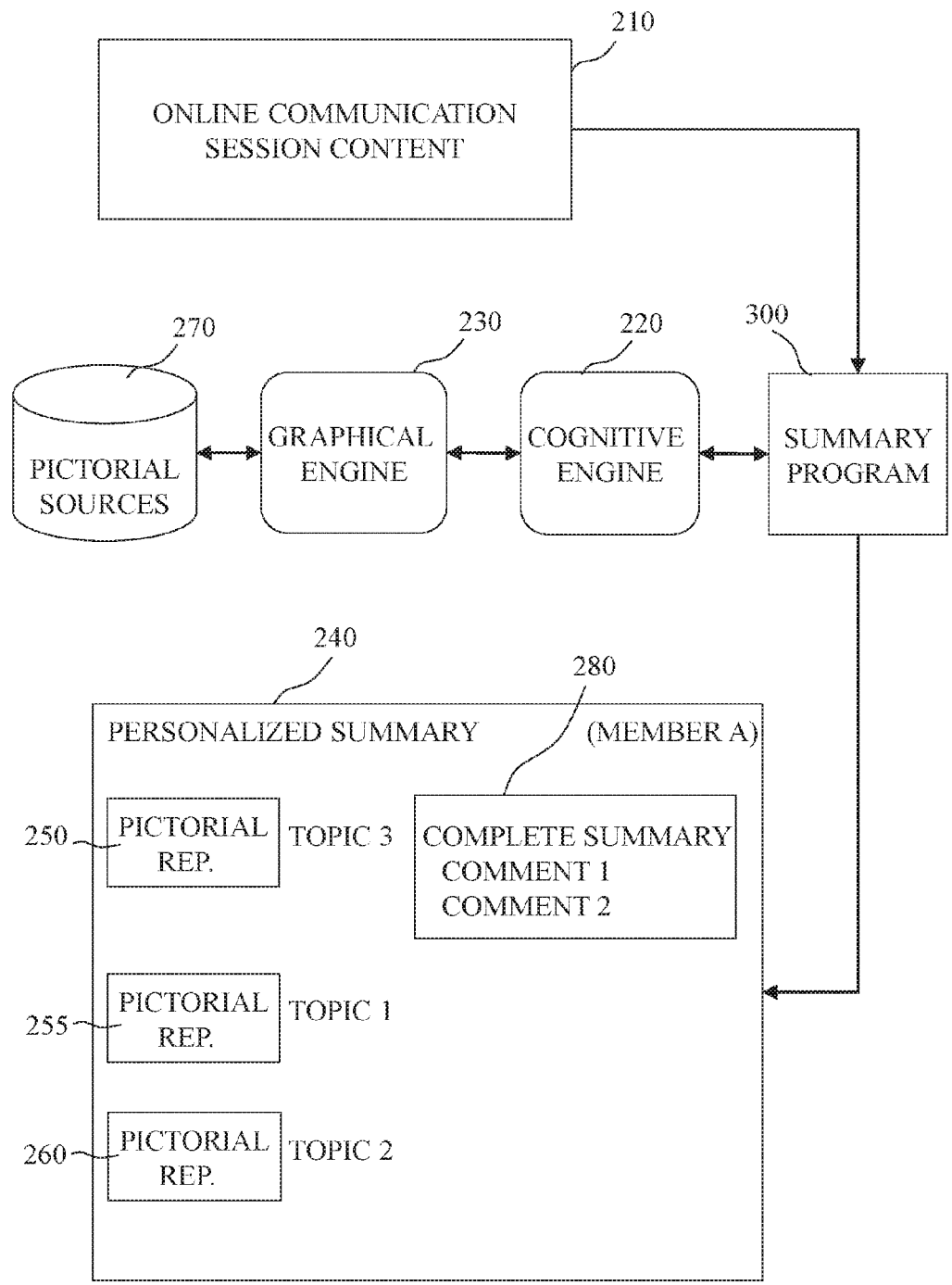
FIG. 2 is a block diagram illustrating an exemplary flow of information from an online group communication to produce a personalized summary with a pictorial representation of the online group communication topics, in accordance with an embodiment of the present invention.

FIG. 2 is a block diagram illustrating an exemplary flow of information from an online group communication session to produce a personalized summary with a pictorial representation of the online group communication topics, in accordance with an embodiment of the present invention. FIG. 2 includes online communication session content 210, cognitive engine 220, graphical engine 230, pictorial sources 270, and personalized summary 240. Online communication session content 210 includes the communication content from group members participating in the communication session. Each member is identified by a user identification (ID), and the communication session content is continually captured until the particular session has ended. In some embodiments, a communication session ends after a predetermined period of time without receiving input to the session. In other embodiments, the communication session ends when all participants have withdrawn from the active session.

An online communication session may be initiated when a group member sends a communication, for example, a text message using a messaging service, sent from a mobile computing device, to one or more recipients, which are designated by a listing of messaging addresses under a group name. One example may be that by sending a communication or message to the group name, all members of the group receive the message. A user may be a member of multiple groups and may have topics of interest determined from participation in communication sessions of the multiple groups to which the user belongs. In embodiments of the present invention, cognitive engine 120 determines the participation and topics of interest for each member are determined by analyzing the content of each communication session of each group member. The topics of interest are continually updated and modified and may be stored in a repository, such as member profiles 160 (FIG. 1) to access for future communication session reference.

In some embodiments of the present invention, summary program 300 receives the content of an online communication session and forwards the content to cognitive engine 220 for analysis. In other embodiments, the content of the current online communication session is streamed to cognitive engine 120. Cognitive engine 220 uses existing natural language processing techniques, semantic analysis, and sentiment analysis to determine the particular topic and summary information for each episode of a communication session. In some embodiments of the present invention, cognitive engine 220 sends the particular topic determined for each episode of the current online communication session to graphical engine 230, and in some embodiments may include summary information pertinent to the representation of the topic and summary of each episode. In other embodiments, the topic and summary information for each episode of a communication session are sent to summary program 300 and then transmitted to graphical engine 230, by summary program 300, to obtain a pictorial representation for the particular topic for each of the episodes of the current online communication session.

Graphical engine 230 is configured to receive the topic of each episode of the online communication session, and in some embodiments of the present invention, receive summary information pertinent to the topic of each episode, as well. Graphical engine 230 searches pictorial sources 270 to obtain a pictorial representation of the episode topic and summary information, such as pictorial representations 250, 255, and 260. In some embodiments, pictorial sources 270 may be a repository of graphical and image files that are categorized by topic and variation of topic to enable efficient search. In other embodiments, pictorial sources 270 may represent a plurality of sources of graphic and image files that are accessible by graphical engine 230 (via network 150, FIG. 1). Graphical engine 230 and cognitive engine 220 return pictorial representation and summary information of episode topics, respectively, to summary program 300.

Summary program 300 receives the pictorial representation, topic, and summary of each episode of the online communication session of members of a group, and generates a summary of the episode that is personalized for each member of the group. Summary program 300 determines the level of member interest for the episode topic from the topics of interest as determined by cognitive engine 220 for the current communication session and topics of interest determined by cognitive engine 220 from previous communication sessions, stored as topics of interest information in member profile 160 (FIG. 1). Summary program 300 prepares a personalized summary, such as personalized summary 240, for each member of the group for the episode(s) of the online communication session. Personalized summary 240 illustrates an exemplary summary prepared particularly for member A, who is a member of the group associated with an online communication session having three episodes, each episode displayed in personalized summary 240 with corresponding pictorial representations and topics. Personalized summary 240 includes pictorial representation 250, which as an image, summarizes the topic (topic 3), of a third episode of the online communication session. Personalized summary 240 also includes complete summary 280, which is personally tailored for member A. Personalized summary 240 also includes a more detailed summary of the third episode of the online communication session, because member A has a significant interest in topic 3, as determined by analysis performed by cognitive engine 220 on the current and previous communication sessions for member A.

Personalized summary 240 also includes pictorial representations 255 and 260, corresponding to topics 1 and 2, respectively. Pictorial representations 255 and 260 and the respective corresponding topics are positioned beneath pictorial representation 250 and topic 3, due to cognitive engine 220 determining that topic 3 is of greater interest to member A than topics 1 and 2. Topic 3 is, therefore, presented above topics of lesser interest to member A within the personalized summary of the current online communication session.

The complete summary may include, but is not limited to, a topic title, one or more summarizing sentence, and may include comments, such as comment 1 and comment 2 of personalized summary 240, which are from other members of the group participating in the episode of the online communication session. The summary also includes the pictorial representation, enabling the member receiving the summary to quickly and efficiently determine the topic of an episode at a glance, without having to read several lines of content. A complete summary for an episode is received by a member of the group of users of the online communication session that has been determined to have a greater interest in the topic of the episode.

In some embodiments of the present invention, the personalized summary listing summaries for multiple episodes lists the summary of an episode higher if the topic of the episode is of interest to the group member and positions the summary of the episode lower in the listing if the topic of the episode is of less interest to the group member. In some embodiments, the episode may be omitted from the personalized summary listing of episodes, based on the member having demonstrated no interest in the episode topic as determined from topics of interest information from the current communication session and previous sessions stored in member profiles 160. The topics of interest information is received from a current (in some embodiments, streaming) communication session, and from previous online communication sessions, previously analyzed by cognitive engine 120, and sent to summary program 300 for use in current personalized summaries and to be stored in member profiles 160 for subsequent reference. In some embodiments of the present invention, topics of interest for a member of the group of users associated with the online communication session may also be received by direct input by group members editing their respective profile in member profiles 160.

In other embodiments of the present invention, personalized summary 240 may include a condensed summary of the episode for group members that are less interested in the topic of the episode. The condensed summary may include a topic title or unordered-list statement along with the pictorial representation. In yet other embodiments, summary program 300 determines that a member of the group associated with the online communications session has no interest in the topic of a particular episode, or has indicated that they do not wish to receive summaries for topics that include the topic of the episode. In such cases, summary program 300 may omit the summary for the particular episode of the online communication session in the personalized summary for the member with no interest.

By generating and providing personalized summaries to members of the group associated with the online communication session, summary program 300 enables members to quickly and efficiently recognize the topic and assimilate the summary at a level of detail consistent with their previously demonstrated interest, or designated within their member profile information.

Figure 3:
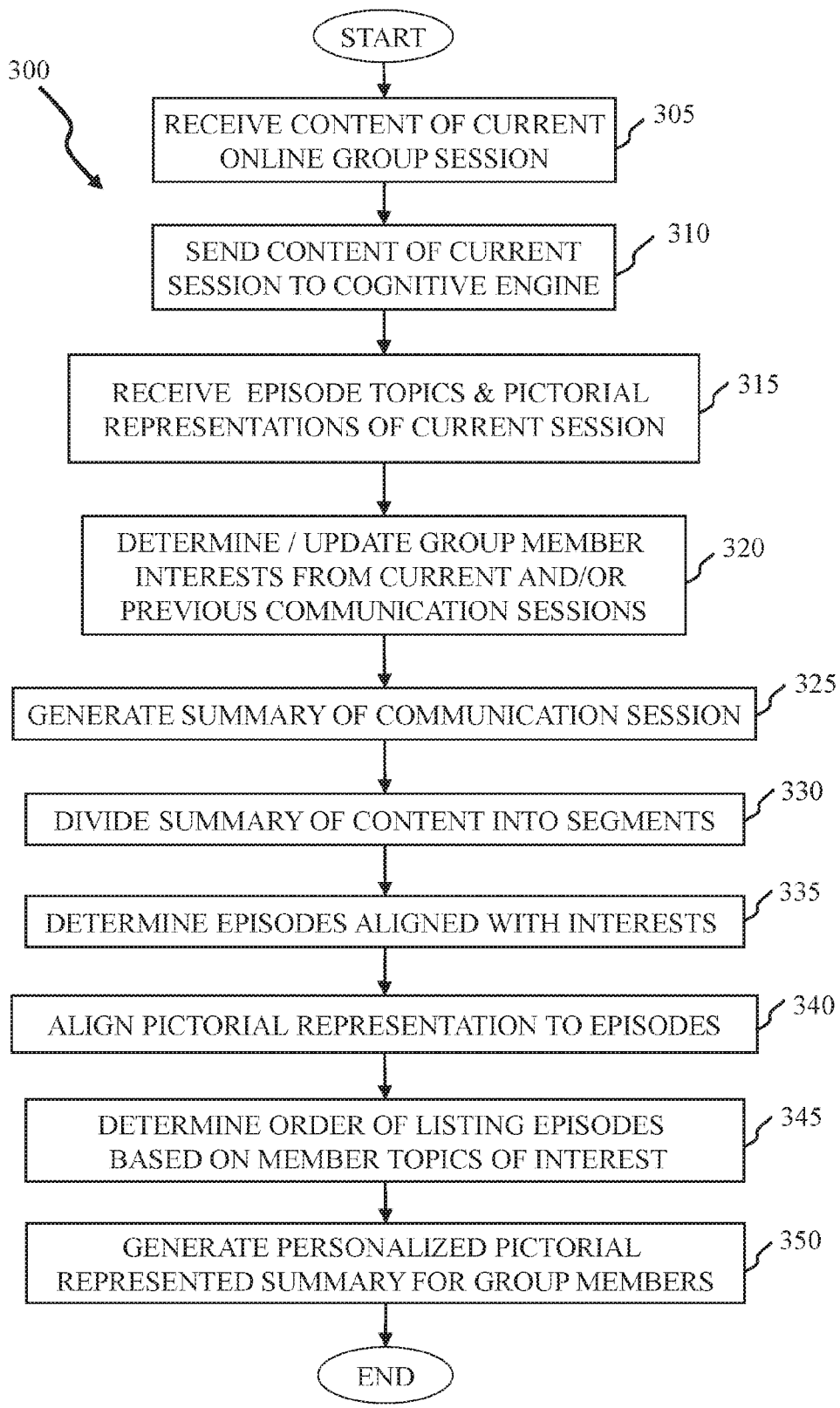
FIG. 3 illustrates operational steps of a summary program, inserted on a social media server, within the distributed data processing environment of FIG. 1, in accordance with an embodiment of the present invention.

FIG. 3 illustrates operational steps of summary program 300, operating on server 110, within the distributed data processing environment of FIG. 1, in accordance with an embodiment of the present invention. In step 305, summary program 300 receives content of the online communication group session. The online communication session is initiated by one of the members of the group, and in some embodiments of the present invention, is identified as the originator of an episode of the communication session. Other members of the group receive notifications or alerts, and may decide to participate in the online communication session, responding to the originator or to comments and/or input from other members of the group. In some embodiments of the present invention, as the session continues, the content of the session is streamed to summary program 300. In other embodiments, the content is stored and is sent to summary program 300 after the session is concluded. In some embodiments of the present invention, messaging program 180 may include a server counterpart (not shown in Figures), hosted in server 110, for example, and may stream content of a current online communication session directly to cognitive engine 120. In other embodiments, the stored content of the online communication session received by summary program 300 is sent to cognitive engine 120 by summary program 300.

In step 310, summary program 300 sends the content of the current online communication session to a cognitive engine. By sending the content of the online communication session of the group to a cognitive engine, such as cognitive engine 120 (FIG. 1), the content of the session is parsed and analyzed and results in the cognitive engine determining the topic for each episode of the communication session. Cognitive engine 120 performs parsing, natural language processing, semantic analysis, and sentiment analysis, and determines the topic and summary information associated with each episode of the online communication session. Cognitive engine 120 also determines from the analysis of the communication session content, the topics of interest of the group members of the session. The topics of interest for group members determined from the current communication session are used in conjunction with topics of interest information previously determined for group members by cognitive engine 120 from previous sessions in which the group members participated. In some embodiments of the present invention, information associated with both current and previous topics of interest are used in preparation of a group member's personalized summary.

In step 315, summary program 300 receives episode topics and pictorial representations for the current communication session. The topic of each episode and summary information associated with each episode of the online communication session is received by summary program 300 from cognitive engine 120. Cognitive engine 120 assigns a main topic for each episode of the session, and cognitive engine 120 may also identify comments by particular group members that are most pertinent to the topic, and include the comments and other information as summary information associated with the topic of the episode.

In some embodiments of the present invention, cognitive engine 120 also forwards the topic of each episode to graphical engine 130 (FIG. 1), and may include the associated summary information for each episode of the analyzed current communication session. Graphical engine 130 applies the received topic information and, if included, the associated summary information, to determine a pictorial representation of the topic of each episode. In other embodiments, the topic and summary information for each episode of the online communication session are received by summary program 300, without cognitive engine forwarding the episode topic information to graphical engine 130, and summary program 300 in turn, forwards the topic of each episode, and may include the associated summary information for each episode of the current communication session, to graphical engine 130. Graphical engine 130 uses the episode topic and, if included, the summary information for each episode, to determine a pictorial representation of each episode topic of the communication session. Graphical engine 130 searches pictorial sources 140 to obtain a pictorial representation of the topic of each episode of the communication session.

In some embodiments of the present invention graphical engine 130 returns the pictorial representation to cognitive engine 120. Cognitive engine 120 sends the topic, summary information, and the pictorial representation, for each episode of the current communication session, along with the topics of interest information for each of the group members, to be received by summary program 300. In other embodiments, summary program 300 receives the topic and summary information for each episode of the current communication session, from cognitive engine 120, along with the topics of interest information of the group members. Summary program 300 sends the topic, and may include summary information, for each episode of the current communication session, to graphical engine 130, which determines and obtains a pictorial representation of the topic of each episode. Summary program 300 receives the pictorial representation from graphical engine 130.

In step 320, summary program 300 determines and/or updates group member interests from current and/or previous communication sessions. The interest of each member of the group is determined by cognitive engine 120's analysis of the member's participation in the current online communication session, and previous online communication sessions with the group or from previous sessions with other groups. The content of sessions that each member has previously participated in is analyzed by cognitive engine 120 (FIG. 1) as part of the analysis performed for each online communication session, and topics of interests are determined, applied to current communication sessions, and stored in member profile 160 as reference information for subsequent communication sessions. Topics of interest for group members may also be received by members of the group manually entering or editing their interest in their respective member profiles, such as member profiles 160. The topics of interest for each member are continually updated based on the participation of each member in online communication sessions with the group and from sessions with other groups. If there is no previous topics of interest information available in member profile 160 for a group member, cognitive engine 120 determines topics of interest for the group member based on analysis of the current communication session in which the group member participated. Summary program 300 determines and updates the topics of interest for each of the members of the group.

The profile of each member of the group, as may be found in member profiles 160, is continually updated for each online communication session to reflect the topics of interests of each member of the group. For example, as a member of a group is engaged in an online communication session, the content of the session is streamed to cognitive engine 120 (FIG. 1) for analysis, which includes determining the members of the group interested in the topic of an episode of the communication session. In some embodiments of the present invention, the quantity of episodes of a particular topic in which the member participates, the amount of participation, the frequency of response, and the sentiment and semantic content of the member's contribution, as determined from analysis of the current communication session and from previous communication sessions, are used to determine the extent of interest of a group member to a determined topic of an episode of the current online communication session. The analysis of the group member's participation in the current online communication session may be used to contribute to topics of interest and extent of interest associated with each group member. In other embodiments, participating members may manually indicate an extent of interest in a particular topic.

In step 325, summary program 300 generates a summary of the online communication session of the group. The analyzed content from cognitive engine 120 includes identification of a topic of each episode of the current communication session, as well as summary information and comments by group members that are associated and supportive of the episode content. For example, an online communication session includes three episodes, each with a particular topic. The communication session includes multiple group members, and the content of each episode is streamed to summary program 300 and transmitted to cognitive engine 120 (FIG. 1), which is hosted on server 110. The streamed content is analyzed using existing parsing techniques, natural language processing, semantic analysis, and sentiment analysis. The analysis of cognitive engine 120 determines the most prevalent, or likely main topic associated with each of the three episodes of the communication session, as well as determining topics of interest and an extent of interest for group members for each of the three episodes. Summary program 300 receives the analyzed content from cognitive engine 120 and generates a summary of the session, which includes determining the main topic of each episode, and forming associations between the main topics and summary information for each episode of the session. In some embodiments of the present invention, summary program 300 may include particular comments and statements pertinent to the main topic of each of the three episodes and identify the members that contributed the comments and statements.

In step 330, summary program 300 divides the summary information of the communication session into segments with each segment aligned with a particular episode topic, and each episode topic associated information and comments. Summary program 300 divides the cumulative summary of all topics, comments, summary information, and episodes of the content of the online communication session into segments with each segment aligning respectively with each episode topic of the communication session.

In step 335, summary program 300 determines which episodes of the online communication session are aligned with topics of interest for each member of the group. Summary program 300 determines a categorization of the group members, including which group members are participants, originator, and non-participants with interests. Summary program 300 further determines whether, and to what extent, the topics of the episodes of the current online communication session align with the topics of interests of each member of the group, based on the topics of interest information received from cognitive engine 120. For example, summary program 300 determines the group members associated with the current online communication session and determines the categorization of each member of the group for the current session. Some members participated in the session and contributed to the content generated, other members may have only participated in some portion of the session, or participated, but did not contribute content, while yet other members may not have participated at all, but are still members of the group that produced content from the online communications session. After identifying the members of the group and having segmented summarized content into segments associated with the topic for each episode of the online communication session, summary program 300 accesses member profiles 160 and along with group member topics of interest information from the current communication session, determines the interest for each member of the group and determines the episodes of the current communication session that align with each group member's interests.

In step 340, summary program 300 aligns a pictorial representation of a topic of the communication session to the corresponding episode of the session. The pictorial representation of a topic, received from graphical engine 130, for each episode of the online communication session, is aligned with its corresponding episode of the current online communication session. Each episode of the analyzed online communication session is associated with an aggregate of information that includes a topic, summary information, comments by members, and a pictorial representation of the episode topic. The aggregate of information summarizing the analyzed online communication session enables personalized summaries to be prepared and made available for members of the group. Personalized summaries may include complete or condensed summaries, depending on the topics of interest determined for each member of the group associated with the communication session. Each personalized summary includes a pictorial representation for each episode of the session to efficiently indicate the topic of the episode.

In step 345, summary program 300 determines an order of listing the episodes of the online communication session for the personalized summary. The order in which episodes are listed within the personalized summary for each group member is based on the topics of interest for the particular member of the group. Summary program 300 determines an order in which the episodes of the online communication session are listed in the summary of the current online communication session for each group member. For each personalized summary for a particular member of the group, summary program 300 places at the top of the listing of episodes of the communication session the episodes having topics of greater interest to the particular member of the group, and places the episodes having lesser interest, or no interest, towards the bottom of the listing of episodes. In some embodiments of the present invention, summary program 300 determines an extent of interest based on the quantity of episodes in which a member of the group participated, the amount of content the member contributed to the episode(s), the frequency of response, and the semantic and sentiment content of the contributions made by the group member. The order of listing episodes of the current online communication session within the personalized summary reflects the extent of interest determined for each group member.

For example, a member of the group that has participated on ten episodes of a particular topic and has contributed to each episode, and the content contributed was favorable and supportive towards the topic, may be considered to have a greater level of interest in the topic of the episode, as compared to a member that has participated in two episodes of the same topic and has contributed only three comments, two of which were neutral, and one disagreeing with a previous comment without offering any reason or support, may be considered to have a lesser level of interest in the episode topic. The member having a greater level of interest may have the particular episode of the communication session listed at or near the top of a personalized summary of the communication session, whereas the member with a lesser level of interest for the topic of the episode may have the episode listed at or towards the bottom of the summary of the communication session. In some embodiments of the present invention, an episode of lesser interest may be omitted from a personalized summary of an online communication session.

In step 350, summary program 300 generates a personalized pictorial represented summary for each group member. Summary program 300 lists episodes of the online communication session in a summary of the session. Summary program 300 orders the listing of the episodes based on the alignment of the topics of the episode of the current online communication session to the topics of interest included in member profiles 160. Summary program 300 lists the episodes having topics of greater interest at the top of the summary and lists the episodes having topics of lesser interest towards the bottom of the summary. Summary program 300 includes the pictorial representation that is aligned to the topic of an episode for each episode of the communication session, and positions the pictorial representation adjacent to the text of the topic title.

Summary program 300 determines whether a complete summary or a condensed summary is prepared for each episode of the communication session, based on the interest of the member for which the personalized summary is prepared. In some embodiments of the present invention, for members having an interest in the topic of an episode of the communication session, summary program 300 provides a complete summary, which may include, but is not limited to, a title of the topic, one or more summary sentences of the episode that may include summary information, and comments associated with the topic, which were made by members contributing to the content of the episode. For members having low interest in the topic of an episode of the communication session, summary program 300 provides a condensed summary, which may include, but is not limited to, a title of the topic and brief unordered list statement summarizing the episode.

In some embodiments of the present invention, summary program 300 provides group members with a notification that an online communication session summary is available, and includes a uniform resource locator (URL) link to access the summary, which is personalized for each member of the group, based on the topics of interest information stored in member profiles 160, and the topics determined for each episode of the communication session. The notification may be a short message service (SMS) text message. In other embodiments, summary program 300 may use an email to notify group members of the communication session summary, including a link, or may include the actual summary information in the email. In yet other embodiments, group members may access a messaging service site in which personalized summaries of communication sessions are posted or otherwise available to the respective member.

Embodiments of the present invention have been presented with reference to text-based content for online communication sessions; however, some embodiments include audio-based online communication sessions which are analyzed by cognitive engines that are configured to determine topics, and semantic and sentiment aspects of audio content, and provide personalized summaries that include pictorial representations of the topic of session episodes, and determine whether the episode summary is a complete or condensed summary, based on respective group member's topic of interest information.

In some embodiments of the present invention, personalized summaries include a listing of all episodes included within a particular online communication session. In other embodiments of the present invention, each episode of an online communication session that includes multiple episodes, is presented or made available as separate personalized summaries for respective group members, in which case there is no listing order of episodes.

Figure 4:
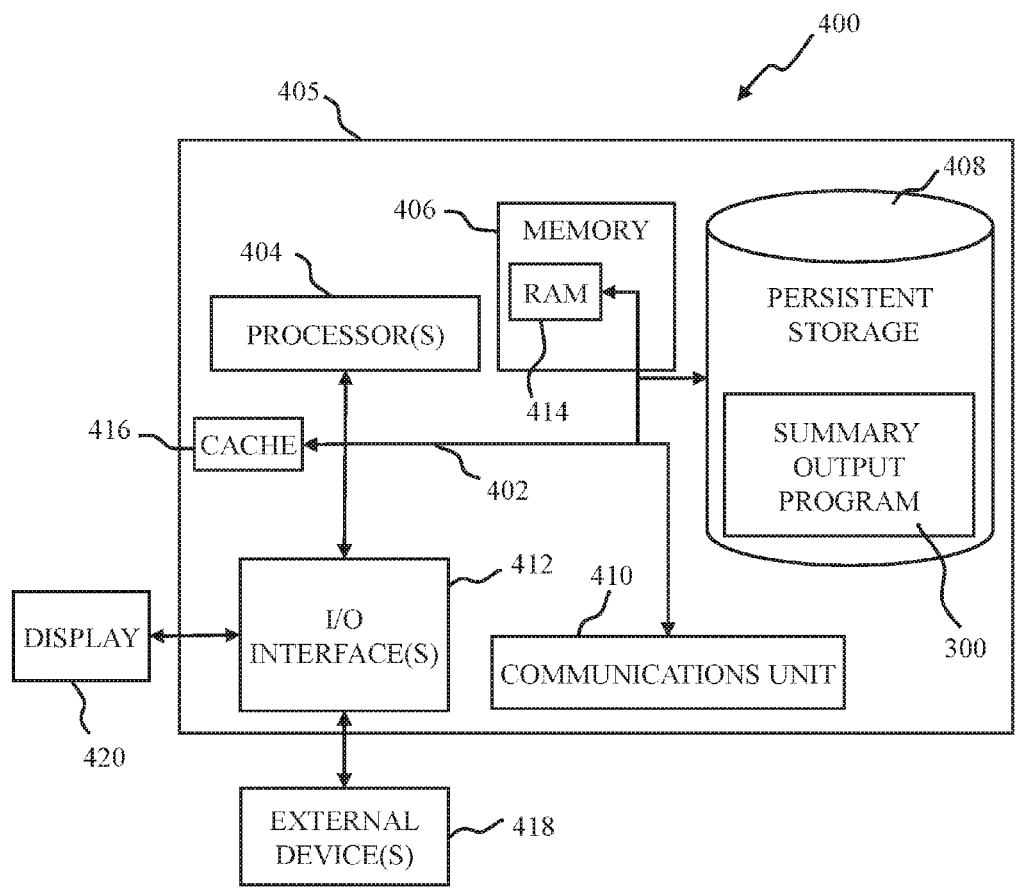
FIG. 4 depicts a block diagram of components of an online communication system, including a server computer capable of operationally performing the summary program, in accordance with an embodiment of the present invention.

FIG. 4 depicts a block diagram of components of computing system 400, including server computer 405, capable of operationally performing summary program 300, in accordance with an embodiment of the present invention.

Server computer 405 includes components and functional capability similar to server 110, and computing devices 170 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Summary program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Summary program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., summary program 300, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a summary of an online communication session, the method comprising:

receiving, by one or more processors, a particular topic and summary information for each of one or more episodes of a current online communication session, and information regarding topics of interests for each member of a group of users, wherein content of the current online communication session is generated by members of the group of users;

receiving, by one or more processors, a pictorial representation of the particular topic for the one or more episodes of the current online communication session, wherein determining the pictorial representation of each episode of the one or more episodes of the current online communication session is based on the particular topic of each episode; and generating, by one or more processors, a summary of the current online communication session that is personalized for members of the group of users, wherein the summary that is personalized includes:

determining, by one or more processors, a level of interest in a first topic of a first episode and a second topic of a second episode, of the one or more episodes of the current online communication session, for a member of the group of users, based on one or a combination of: an amount of participation and contribution by the member of the group of users during the current online communication session, an amount of participation and contribution by the member of the group of users during previous online communication sessions that include the first topic, and interest preferences input by the member of the group of users;

listing, by one or more processors, the summary and pictorial representation of the one or more episodes of the current online communication session in an order that corresponds to the level of interest in a first topic of a first episode and a second topic of a second episode, of the one or more episodes of the current online communication session held by the member of the group of users; and responsive to determining the level of interest held by the member of the group of users, for the first topic of the first episode of the one or more episodes, to be greater than the level of interest held by the member of the group of users for the second topic of the second episode of the one or more episodes, providing, by one or more processors, a complete summary of the first topic of the first episode positioned before a condensed summary of the second topic of the second episode.

2. The method of claim 1, wherein receiving, by one or more processors, information regarding topics of interests of the group of users, further comprises:

determining, by one or more processors, the information regarding the topics of interest for each member of the group of users based on analysis of the current online communication session received from a cognitive engine, and by receipt of previous analysis by the cognitive engine of previous online communication sessions of the group of users, as well as previous online communication sessions of other groups in which a member of the group of users also participates.

3. The method of claim 1, wherein the summary of the one or more episodes of the current online communication session that is personalized, is tailored for each member of the group of users, based on information regarding topics of interest for each member of the group of users as determined by an analysis of participation and contribution of each member of the group of users, performed by a cognitive engine, during the current online communication session and previous online communication sessions of the group of users, and participation and contribution of members of the group of users during previous online communication sessions with other groups.

4. The method of claim 1, wherein each member of the group of users engaged in an online communication session is assigned to at least one role of: an originator of a topic of the online communication session, a participant providing input and commentary directed towards the topic of the online communication session, a non-participant of an episode of the online communication session that is determined to have an interest in a topic of the episode, or a non-interested participant of the topic of the online communication session.

5. The method of claim 1, wherein a member of the group of users indicates a preference between viewing the summary of the current online communication session that is personalized as a detailed summary, and viewing the summary that is personalized as a condensed summary.

6. The method of claim 1, wherein a member of the group of users that is a non-participant of the current online communication session and determined to have interest in at least one particular topic of the one or more episodes of the current online communication session, receives a summary of the current online communication session that is personalized for the member of the group of users that is a non-participant, and includes in the summary of the current online communication session that is personalized, the pictorial representation of the one or more episodes.

7. The method of claim 1, wherein a pictorial representation of the particular topic and the summary information of an episode of the one or more episodes of the online communication session is obtained by a graphical engine, based on the graphical engine receiving a topic and summary information from a cognitive engine that analyzes the content of the current online communication session.

8. The method of claim 1, wherein an episode of the one or more episodes of the current online communication session is omitted from the summary that is personalized for a member of the group of users, in response to determining the member of the group of users to have low interest in the particular topic of the episode.

9. The method of claim 1, wherein the complete summary includes descriptive text of the first topic of the first episode and the summary information of comments from members of the group of users regarding the first topic.

10. The method of claim 1, providing, by one or more processors, wherein the condensed summary includes at least a pictorial representation and a text title of the first topic of the first episode.

11. A computer program product for generating a summary of an online communication session, the computer program product comprising:

one or more computer readable storage medium(s) and program instructions stored on the one or more computer readable storage medium(s), the program instructions comprising:

program instructions to receive a particular topic and summary information for each of one or more episodes of a current online communication session, and information regarding topics of interests for each member of a group of users, wherein content of the current online communication session is generated by members of the group of users;

program instructions to receive a pictorial representation of the particular topic for the one or more episodes of the current online communication session, wherein determining the pictorial representation of each episode of the one or more episodes of the current online communication session is based on the particular topic of each episode; and program instructions to generate a summary of the current online communication session that is personalized for members of the group of users, wherein the program instructions to generate the summary that is personalized includes:

program instructions to determine a level of interest in a first topic of a first episode and a second topic of a second episode, of the one or more episodes of the current online communication session, for a member of the group of users, based on one or a combination of: an amount of participation and contribution by the member of the group of users during the current online communication session, an amount of participation and contribution by the member of the group of users during previous online communication sessions that include the first topic, and interest preferences input by the member of the group of users;

program instructions to list the summary and pictorial representation of the one or more episodes of the current online communication session in an order that corresponds to the level of interest in a first topic of a first episode and a second topic of a second episode, of the one or more episodes of the current online communication session held by the member of the group of users; and responsive to determining the level of interest held by the member of the group of users, for the first topic of the first episode of the one or more episodes, to be greater than the level of interest held by the member of the group of users for the second topic of the second episode of the one or more episodes, program instructions to provide a complete summary of the first topic of the first episode positioned before a condensed summary of the second topic of the second episode.

12. The computer program product of claim 11, wherein the summary of the one or more episodes of the current online communication session that is personalized, is tailored for each member of the group of users, based on information regarding topics of interest for each member of the group of users as determined by an analysis of participation and contribution of each member of the group of users, performed by a cognitive engine, during the current online communication session, and during previous online communication sessions of the group of users, and participation and contribution of members of the group of users during previous online communication sessions with other groups.

13. The computer program product of claim 11, further comprising:
program instructions to assign each member of the group of users engaged in an online communication session to at least one role of: an originator of a topic of the online communication session, a participant providing input and comment directed toward the topic of the online communication session, a non-participant of an episode of the online communication session that is determined to have an interest in a topic of the episode, or a non-interested participant of the topic of the online communication session.

14. The computer program product of claim 11, further comprising:
program instructions for a member of the group of users to indicate a preference between viewing the summary of an episode of the one or more episodes of the current online communication session that is personalized as a detailed summary, and viewing the summary that is personalizes as a condensed summary.

15. The computer program product of claim 11, wherein a pictorial representation of the particular topic and the summary information of an episode of the one or more episodes of the online communication session is obtained by a graphical engine, based on the graphical engine receiving a topic and summary information from a cognitive engine that analyzes the content of the current online communication session.

16. A computer system for generating a personalized summary of an online communication session, the computer system comprising:
one or more computer processors, one or more computer readable storage media, program instructions stored on the computer readable storage media for execution by at least one of the one or more processors, the program instructions comprising:
program instructions to receive a particular topic and summary information for each of one or more episodes of a current online communication session, and information regarding topics of interests for each member of a group of users, wherein content of the current online communication session is generated by members of the group of users;
program instructions to receive a pictorial representation of the particular topic for the one or more episodes of the current online communication session, wherein determining the pictorial representation of each episode of the one or more episodes of the current online communication session is based on the particular topic of each episode; and
program instructions to generate a summary of the current online communication session that is personalized for members of the group of users, wherein the program instructions to generate the summary that is personalized includes:
program instructions to determine a level of interest in a first topic of a first episode and a second topic of a second episode, of the one or more episodes of the current online communication session, for a member of the group of users, based on one or a combination of: an amount of participation and contribution by the member of the group of users during the current online communication session, an amount of participation and contribution by the member of the group of users during previous online communication sessions that include the first topic, and interest preferences input by the member of the group of users;
program instructions to list the summary and pictorial representation of the one or more episodes of the current online communication session in an order that corresponds to the level of interest in a first topic of a first episode and a second topic of a second episode, of the one or more episodes of the current online communication session held by the member of the group of users; and
responsive to determining the level of interest held by the member of the group of users, for the first topic of the first episode of the one or more episodes, to be greater than the level of interest held by the member of the group of users for the second topic of the second episode of the one or more episodes, program instructions to provide a complete summary of the first topic of the first episode positioned before a condensed summary of the second topic of the second episode.

17. The computer system of claim 16, wherein program instructions to receive information regarding topics of interests for each member of the group of users, further comprises:
program instructions to determine, by one or more processors, the information regarding the topics of interest for each member of the group of users, based on analysis of the current online communication session received from the cognitive engine, and by receipt of previous analysis of previous online communication sessions of the group of users, as well as previous online communication sessions of other groups in which a member of the group of users also participates.

18. The computer system of claim 16, further comprising:
program instructions for a member of the group of users to indicate a preference between viewing the summary of an episode of the one or more episodes of the current online communication session that is personalized as a detailed summary, and viewing the summary that is personalized as a condensed summary.

19. The computer system of claim 16, wherein a pictorial representation of the particular topic and the summary information of an episode of the online communication session is obtained by a graphical engine, based on the graphical engine receiving a topic and summary information from a cognitive engine that analyzes the content of the current online communication session.

20. The computer system of claim 16, wherein an episode of the one or more episodes of the current online communication session is omitted from the summary that is personalized for a member of the group of users, in response to determining the member of the group of users to have low interest in the particular topic of the episode.

* * * * *